Feb. 4, 1958     J. W. BECKHAM ET AL     2,821,768
CLAMPING BAND FOR PIPE JOINTS
Filed Dec. 13, 1954     2 Sheets-Sheet 1
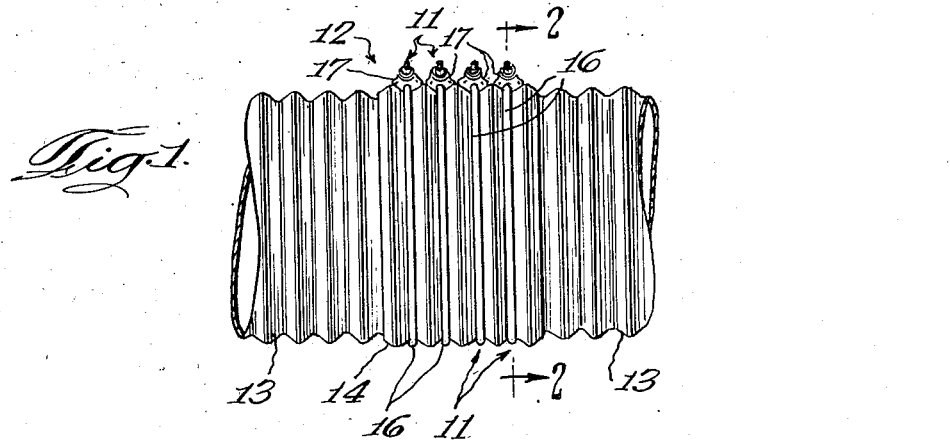
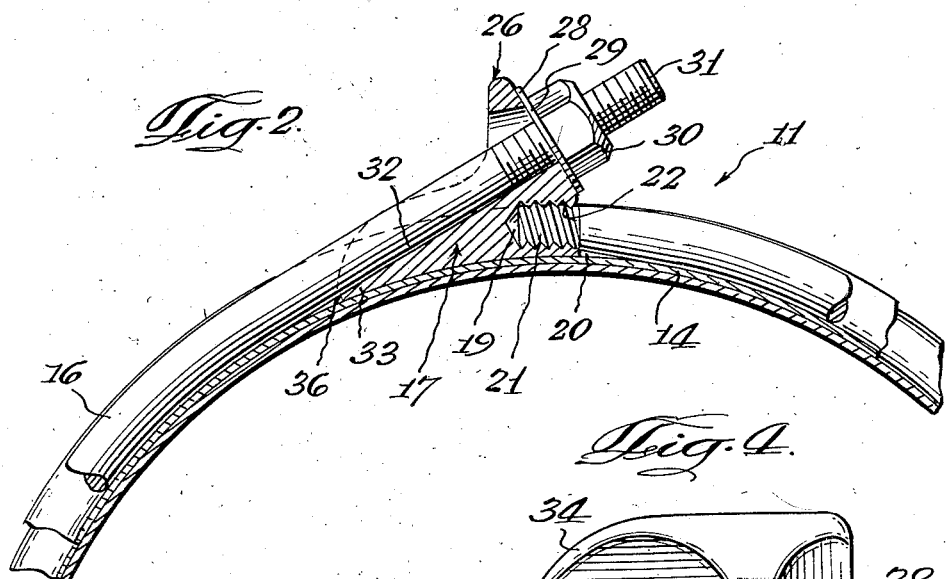
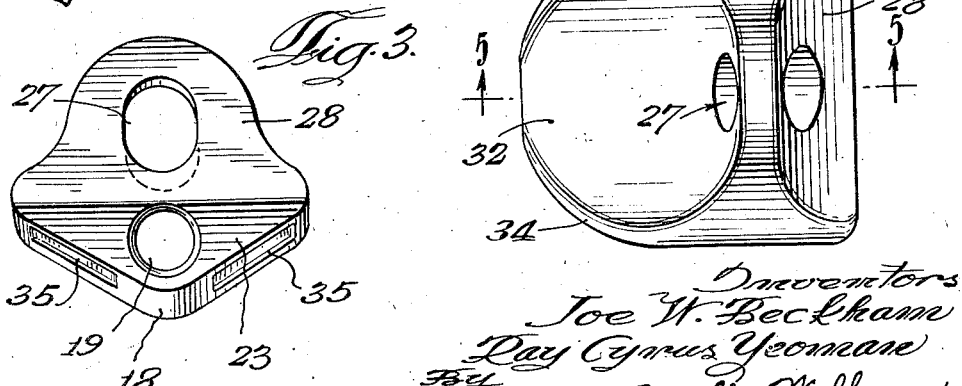

Feb. 4, 1958 J. W. BECKHAM ET AL 2,821,768
CLAMPING BAND FOR PIPE JOINTS
Filed Dec. 13, 1954
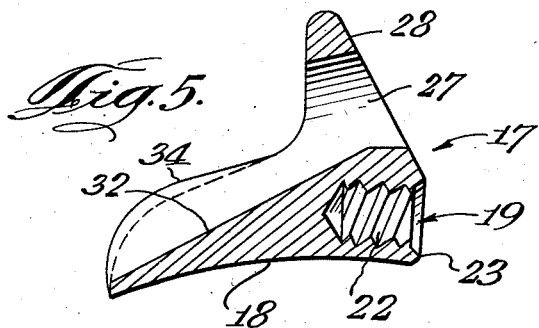
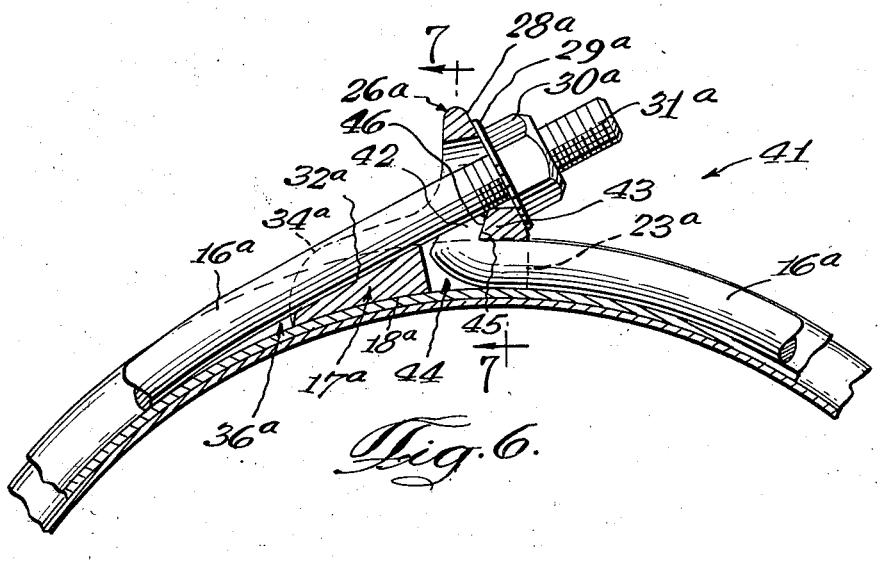
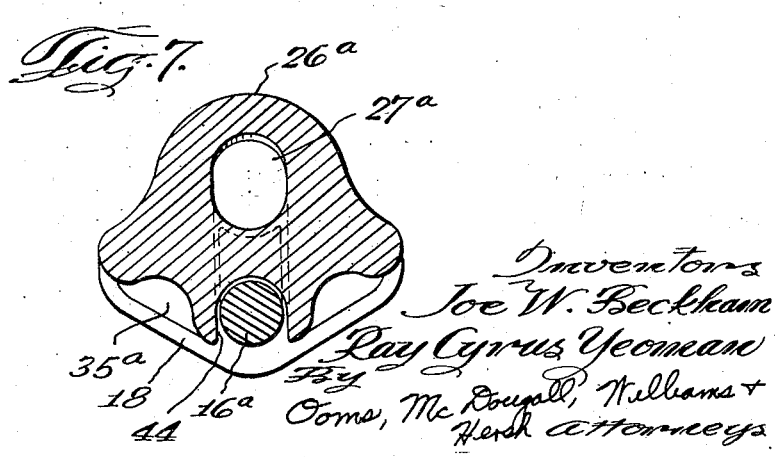

United States Patent Office 2,821,768
Patented Feb. 4, 1958

2,821,768

CLAMPING BAND FOR PIPE JOINTS

Joe W. Beckham and Ray Cyrus Yeoman, Lufkin, Tex., assignors to Texas Foundries, Inc., Lufkin, Tex., a corporation of Texas Application December 13, 1954, Serial No. 474,958

7 Claims. (Cl. 24—276)

This invention relates to clamping bands for pipe joints and also to shoes for use with such bands.

Sections of corrugated and other types of thin walled pipe are often joined by arranging the sections with their ends in closely contiguous abutting relation, placing a joint sleeve around the abutting ends, and securing the sleeve in place with two or more clamping bands. The clamping bands are often made of rod strap with the ends of the strap joined by clamping shoes which may be cast or otherwise suitably formed from metal. A construction of this sort is disclosed and claimed in Patent No. 2,491,673 issued December 20, 1949, issued to the assignee of the present application on an application of Harold T. Lytle. In some respects, the present invention may be regarded as an improvement upon the invention set forth in this prior patent.

Accordingly, one principal object of the present invention is to provide improved clamping bands for pipe joints and improved shoes for use with such bands.

A further object is to provide improved shoes and bands of the foregoing character whereby the rod strap for each of the bands is disposed entirely in a single diametrical plane so that the assembled clamping band will automatically aline itself throughout its periphery with the valley of the corrugated pipe to which the band is applied.

Another object is to provide improved pipe joint shoes constructed so that the rod strap and the shoe are in contact with the pipe for substantially the entire circumference of the pipe.

It is a further object of the invention to provide improved pipe joint shoes which may be readily and quickly assembled with and disconnected from the rod straps of the clamping bands.

Another object is to provide improved clamping bands which may be assembled and tightened down quickly and readily and which clamp the pipe joints effectively and dependably.

A further object is to provide clamping bands and shoes therefor which are simple in construction and low in cost.

Further objects and advantages of the invention will appear from the following description, taken with the accompanying drawings, in which:

Figure 1 is an elevational view of a pipe joint utilizing a plurality of exemplary clamping bands constituting illustrative embodiments of the invention;

Fig. 2 is an enlarged fragmentary elevational sectional view of the clamping band, taken diametrically through the pipe joint generally along a line 2—2 in Fig. 1;

Fig. 3 is an end elevational view of a pipe joint shoe employed in each of the clamping bands of Figs. 1 and 2;

Fig. 4 is a top view of the shoe of Fig. 3;

Fig. 5 is a longitudinal sectional view of the shoe, taken generally along a line 5—5 in Fig. 4;

Fig. 6 is an elevational sectional view of a modified clamping band constituting a second illustrative embodiment of the invention; and Fig. 7 is a sectional view taken through the modified band, generally along a line 7—7 in Fig. 6.

If Figs. 1 and 2 are considered in greater detail, it will be seen that they illustrate a plurality of exemplary clamping bands 11 employed to bind a joint 12 between sections 13 of corrugated pipe. In making the joint 12, the ends of the pipe sections 13 are brought together in contiguous abutting or nearly abutting relation. A longitudinally split corrugated sleeve 14 is then placed around the joint in overlapping relation to the ends of the pipe sections 13. The clamping bands 12 are then mounted around the sleeve 14 to bind the joint and thereby effect a mechanically strong and substantially fluid-tight union between the pipe sections 13. Four of the clamping bands 11 are employed in the joint construction shown in Fig. 1.

It will be seen that each of the clamping bands 11 comprises a ring-shaped generally circular length of rod strap 16 adapted to encircle the joint sleeve 14 and to be received in the valleys of the pipe corrugations. A shoe or block 17 is provided to join the ends of the strap 16 so that the band 11 may be tightened down.

In order that the shoe 17 may be snugly received in the pipe corrugations, the shoe is formed with a curved convex lower surface 18. The curvature of the lower surface 18 may be substantially sinusoidal or otherwise may be curved to conform to the shape of the pipe corrugations.

Provision is made for connecting or detachably anchoring one end of the rod strap 16 to the shoe 17. For this purpose, an opening 19 extends longitudinally into one end of the shoe closely adjacent the lower surface 18. It will be seen that the opening 19 extends generally parallel to the lower surface 18. In this way, the end of the rod strap 16 is maintained as closely as possible in intimate contact with the joint sleeve 14 with only a small, virtually negligible clearance or interval 20 between the end of the rod strap and the joint sleeve immediately adjacent the shoe 17. For the purpose of detachably anchoring or connecting the rod strap 16 to the shoe, interlocking external and internal threads 21 and 22 are formed on the end of the rod strap 16 and in the shoe 17 along the opening 19. An end face 23 is formed around the opening 19 on the shoe 17. It will be seen that the end face 23 extends generally radially relative to the pipe, or, in other words, generally at right angles to the line of the rod strap 16.

To receive the opposite end of the rod strap 16, a lug 26 is formed on the shoe 17 in immediately overlying relation to the opening 19. The end of the rod strap 16 is adapted to be received in an aperture 27 extending through the lug 26 at an inclined angle. It will be seen that the aperture 27 is vertically elongated and noncircular in cross section to facilitate insertion of the rod strap into the aperture. On the front of the lug 26 a flat inclined abutment surface 28 is formed around the aperture 27 to serve as a bearing surface for a washer 29 received on the rod strap. A nut 30 is mounted on an externally threaded end portion 31 formed on the rod strap. To support the rod strap 16 and transmit clamping pressure to the pipe sleeve 14, an inclined top surface 32 is formed on the shoe 17 immediately behind the lug 26. It will be seen that the top surface 32 slopes gradually downwardly from the lug 26 toward the rear end of the shoe 17. Adjacent the lug 26 the surface 32 is level with the lower extremity of the aperture 27. Thus the top surface 32 slopes upwardly from a thin tapered rear edge 33 on the shoe 17 toward a point immediately above and in vertical alinement with the opening 19. As shown, the abutment surface 28 is substantially at right angles to the slope line of the upper surface 32. Flanges or walls 34 extend longitudinally along the top of the shoe 17 on opposite sides of the upper surface 32 to retain the rod strap and maintain longitudinal alinement between the rod strap and the shoe. On the underside of the shoe, cavities 35 are formed to reduce the weight of the shoe.

It will be understood that the clamping band 11 is assembled by screwing the internally threaded opening 19 on the shoe 17 over the threaded end 21 on the rod strap 14. This may be done either before or after the rod strap has been mounted on the pipe joint sleeve. The opposite threaded end 31 of the rod strap 16 is inserted through the aperture 27 in the lug 26 and then the washer 29 and the nut 30 are mounted on the rod strap. The band 11 is tightened by screwing down the nut 30. When the band is drawn up, the entire periphery of the pipe sleeve 14 is engaged by either the rod strap or the shoe, with the exception of the negligible interval 20 and another negligible interval or clearance 36 immediately adjacent the opposite ends of the shoe 17. It will be noted that the entire rod strap 14 is in a single diametrical plane and hence the rod strap automatically alines itself with the valley of the pipe corrugation. Likewise, the shoe 17 is automatically maintained in alinement with the corrugation and the rod strap. Since one end of the rod strap is simply anchored to the shoe 17, a rod strap of minimum length may be employed.

Figs. 6 and 7 illustrate a slightly modified joint clamp 41 which in most respects is similar to the clamping band 11. Accordingly, those components of the clamping band 41 which correspond to components of the band 11 have been given the same reference characters with the addition of the suffix "a."

In the modified clamping band 41 the rod strap 16a is anchored or detachably connected to the modified shoe 17a by means of interlocking elements 42 and 43 formed on the rod strap and the shoe. It will be seen that the end of the rod strap 16a is received in an opening 44 formed in the shoe 17a. The opening 44 corresponds to the opening 19 of the clamping band 11, but the opening 44 is channel-shaped and opens into the curved lower surface 18a as well as the end face 23a of the shoe 17a. It will be seen that the interlocking elements 42 and 43 are in the form of an upwardly projecting hook 42, formed on the end of the rod strap 16a, and an abutment formed on the shoe 17a above the opening 44. The hook and the abutment 43 have inclined interengageable surfaces 45 and 46. All other details of the rod strap 16a and the shoe 17a may be the same as in the embodiment of Figs. 1–5.

Since the opening 44 is channel-shaped and downwardly opening, the rod strap 16a may be maintained in engagement with the periphery of the pipe up to a point disposed inwardly of the end face 23a on the shoe 17a. In other words, there is an overlap between the area of the pipe engaged by the hooked end of the rod strap 16a and the shoe 17a. Accordingly, there is only the single negligible clearance or interval 36a between the rod strap 16a and the pipe at the opposite end of the shoe 17a. The additional interval 20 in the embodiment of Figs. 1–5 is eliminated in the embodiment of Figs. 6 and 7. All of the advantages of the first embodiment are also provided by the second embodiment of Figs. 6 and 7.

Various modifications, alternative constructions and equivalents may be employed without departing from the true spirit and scope of the invention as exemplified in the foregoing description and defined in the following claims.

We claim:

1. A shoe for joining the ends of a rod strap adapted to bind corrugated pipe joints, said shoe comprising a block having a curved bottom surface adapted to fit snugly in the valleys of the pipe corrugations, said bottom surface being convexedly curved transversely and concavedly curved longitudinally, said block having an opening therein extending longitudinally of said block at one end thereof for receiving one end of the rod strap, means on said block in said opening for retaining the one end of the strap, an upwardly extending lug on said block immediately overlying and vertically alined with said opening, said lug having an aperture therethrough extending generally longitudinally of said block and inclined downwardly from said one end toward the opposite end of said block for receiving the opposite end of the rod strap, said aperture being vertically alined with said opening, said lug having a flat inclined abutment surface disposed around said aperture at said one end of said block, said block having an upwardly facing concave surface disposed behind said lug and sloping downwardly therefrom toward said opposite end of said block to support the rod strap adjacent said opposite end thereof, and a pair of upwardly projecting flanges on said block extending longitudinally thereof on opposite sides of said upwardly facing surface to retain the rod strap thereon in longitudinal alinement with said block.

2. A shoe for joining the ends of a rod strap adapted to bind corrugated pipe joints, said shoe comprising a block having a curved bottom surface adapted to fit snugly in the valleys of the pipe corrugations, said bottom surface being convexedly curved transversely and concavely curved longitudinally, said block having an opening extending longitudinally of said block into one end thereof closely adjacent said bottom surface and substantially parallel thereto for receiving one end of the rod strap, internal threads on said block in said opening for retaining the one end of the strap, an upwardly extending lug on said block immediately overlying and vertically alined with said threaded opening, said lug having an aperture therethrough extending generally longitudinally of said block and inclined downwardly from said one end toward the opposite end of said block for receiving the opposite end of the rod strap, said aperture being vertically alined with said opening, said lug having a flat inclined abutment surface disposed around said aperture at said one end of said block, said block having an upwardly facing concave surface disposed behind said lug and sloping downwardly therefrom toward said opposite end of said block to support the rod strap adjacent said opposite end thereof, and a pair of upwardly projecting flanges on said block extending longitudinally thereof on opposite sides of said upwardly facing surface to retain the guide strap thereon in longitudinal alinement with said block.

3. A shoe for joining the ends of a rod strap adapted to bind corrugated pipe joints, said shoe comprising a block having a curved bottom surface adapted to fit snugly into the valleys of the pipe corrugations, said bottom surface being convexedly curved transversely and concavedly curved longitudinally, said block having a downwardly opening channel extending therein longitudinally of said block at one end thereof for receiving one end of the rod strap, hook abutment means on said block in said channel for retaining the one end of the strap, an upwardly extending lug on said block immediately overlying and vertically alined with said channel, said lug having an aperture therethrough extending generally longitudinally of said block and inclined downwardly from said one end toward the opposite end of said block for receiving the opposite end of the rod strap, said aperture being vertically alined with said channel, said lug having a flat inclined abutment surface disposed around said aperture at said one end of said block, said block having an upwardly facing concave surface disposed behind said lug and sloping downwardly therefrom toward said opposite end of said block to support the rod strap adjacent said opposite end thereof, and a pair of upwardly projecting flanges on said block extending longitudinally thereof on opposite sides of said upwardly facing surface to retain the rod strap thereon in longitudinal alinement with said block.

4. A clamping band for binding joints in corrugated pipe, said band comprising a generally circular ring-shaped rod strap having free opposite ends, a shoe for joining said ends of said strap, said shoe comprising a block having a curved bottom surface adapted to fit in the pipe corrugations, said bottom surface being convexedly curved transversely and concavedly curved longitudinally, said block having an opening extending longitudinally into the lower portion of said block at one end thereof, one end of said rod strap being detachably received in said opening, said block and said one end of said rod strap having respective interengaging elements thereon for detachably joining said one end of said rod strap to said shoe, an upwardly extending lug on said block and generally overlying said opening, said lug having an aperture therethrough extending generally longitudinally of said block, said aperture being substantially vertically alined with said opening, the opposite end of said rod strap being removably received in said aperture, said opposite end of said rod strap having external threads thereon, a threaded element received over said external threads for tightening said band, said block being provided with a concave channel-shaped top surface behind said lug, said last mentioned surface sloping downwardly from said aperture toward said opposite end of said block, said rod strap extending along said top surface.

5. A clamping band for binding joints in corrugated pipe, said band comprising a generally circular ring-shaped rod strap having free opposite ends, a shoe for joining said ends of said strap, said shoe comprising a block having a curved bottom surface adapted to fit in the pipe corrugations, said bottom surface being convexedly curved transversely and concavedly curved longitudinally, said block having an opening extending longitudinally into the lower portion of said block at one end thereof, one end of said rod strap being detachably received in said opening, said block and said one end of said rod strap having respective interengaging internal and external threads thereon for detachably joining said one end of said rod strap to said shoe, an upwardly extending lug on said block and generally overlying said opening, said lug having an aperture therethrough extending generally longitudinally of said block, said aperture being substantially vertically alined with said opening, the opposite end of said rod strap being removably received in said aperture, said opposite end of said rod strap having external threads thereon, a threaded element received over said external threads for tightening said band, said block being provided with a concave channel-shaped top surface behind said lug, said last mentioned surface sloping downwardly from said first mentioned aperture toward said opposite end of said block, said rod strap extending along said top surface.

6. A clamping band for binding joints in corrugated pipe, said band comprising a generally circular ring-shaped rod strap having free opposite ends, a shoe for joining said ends of said strap, said shoe comprising a block having a curved bottom surface adapted to fit in the pipe corrugations, said bottom surface being convexedly curved transversely and concavedly curved longitudinally, said block having an opening extending longitudinally into the lower portion of said block at one end thereof, one end of said rod strap being detachably received in said opening, said one end of said rod strap having a hook thereon, said block having a hook abutment in said opening for detachably engaging said hook, an upwardly extending lug on said block and generally overlying said opening, said lug having an aperture therethrough extending generally longitudinally of said block, said aperture being substantially vertically alined with said opening, the opposite end of said rod strap being removably received in said aperture, said opposite end of said rod strap having external threads thereon, a threaded element received over said external threads for tightening said band, said block being provided with a concave channel-shaped top surface behind said lug, said last mentioned surface sloping downwardly from said aperture toward said opposite end of said block, said rod strap extending along said top surface.

7. A clamping band for binding joints in corrugated pipe, said band comprising a generally circular ring-shaped rod strap having free opposite ends, a shoe for joining said ends of said strap, said shoe comprising a block having a curved convex bottom surface adapted to fit snugly in the valleys of the pipe corrugations, said bottom surface being convexedly curved transversely and concavedly curved longitudinally, said block having an opening extending longitudinally of said block into one end thereof closely adjacent said bottom surface and substantially parallel thereto, one end of said rod strap being detachably received in said opening, said block and said one end of said rod strap having respective interlocking elements thereon for detachably joining said rod strap to said shoe, an upwardly extending lug on said block immediately overlying said opening, said lug having an aperture therethrough extending generally longitudinally of said block and inclined downwardly from said one end toward the opposite end of said block, said aperture being vertically alined with said opening, the opposite end of said rod strap being removably received in said aperture, said opposite end of said rod strap having external threads thereon, a nut and washer received over said threads, said lug having a flat inclined abutment surface disposed around said aperture for engaging said washer, said block having a concave top surface disposed behind said lug and sloping downwardly from said aperture toward said opposite end of said block, said rod strap extending along said top surface, and a pair of upwardly projecting flanges on said block extending longitudinally thereof on opposite sides of said top surface to retain said rod strap thereon in longitudinal alinement with said block.

References Cited in the file of this patent

UNITED STATES PATENTS

| | | |
|---|---|---|
| 494,997 | Dwelle | Apr. 4, 1893 |
| 909,200 | Morgan | Jan. 12, 1909 |
| 911,071 | Reichert | Feb. 2, 1909 |
| 1,481,674 | Barnes | Jan. 22, 1924 |

FOREIGN PATENTS

| | | |
|---|---|---|
| 113,567 | Sweden | Mar. 20, 1945 |
| 838,978 | Germany | May 15, 1952 |